United States Patent [19]

Evans et al.

[11] Patent Number: 4,797,293

[45] Date of Patent: Jan. 10, 1989

[54] PROCESS FOR A NON-CLOUDING, CONCENTRATED TEA EXTRACT

[75] Inventors: David N. Evans, Englishtown; Charles L. Fairchild, East Windsor; Karl C. Kramer, Dunellen; John C. Spruill, Burlington County; Gerard J. Wansor, Mercer County; Robert W. Wood, Cranbury, all of N.J.

[73] Assignee: General Foods Corporation, White Plains, N.Y.

[21] Appl. No.: 60,123

[22] Filed: Jun. 9, 1987

[51] Int. Cl.$^4$ .................................................. A23F 3/16
[52] U.S. Cl. .................................... 426/330.3; 426/597
[58] Field of Search ....................... 426/597, 532, 330.3

[56] References Cited

U.S. PATENT DOCUMENTS

| | | |
|---|---|---|
| 2,891,866 | 6/1959 | Schroeder . |
| 2,963,368 | 12/1960 | Greenbaum .................... 426/597 X |
| 2,978,328 | 4/1961 | Melzard et al. . |
| 3,163,539 | 12/1964 | Barch ............................. 426/597 X |
| 4,003,999 | 1/1917 | Lybrand et al. .................... 424/195 |
| 4,315,036 | 2/1982 | Husaini et al. ....................... 426/387 |
| 4,539,216 | 9/1985 | Tse ....................................... 426/597 |
| 4,552,769 | 11/1985 | Lunder et al. .................. 426/597 X |

*Primary Examiner*—Joseph Golian
*Attorney, Agent, or Firm*—Thomas R. Savoie; Daniel J. Donovan

[57] ABSTRACT

A non-clouding, shelf-stable tea concentrate is prepared by lowering the pH of a freshly-prepared concentrate (8 to 24% soluble solids) to between 2.9 and 3.5, chilling the concentrate to between 30° and 45° F., clarifying the concentrate to remove precipitate, and then elevating the pH of the clarified concentrate to between about 3.9 and 4.3. Preferably the freshly prepared concentrate is prepared by using water which is at least 99% deionized.

9 Claims, No Drawings

PROCESS FOR A NON-CLOUDING, CONCENTRATED TEA EXTRACT

BACKGROUND OF THE DISCLOSURE

1. Field of the Invention

This invention relates to the production of a concentrated tea extract which will remain non-cloudy during prolonged storage at ambient temperatures.

2. Description of the Prior Art

It is well-known in the tea art that aqueous tea extracts contain materials, generally thought to be complexes of tea tannins and caffeine, which either are or become insoluble at temperatures of below about 120° F. (49° C.). Thus, on standing, a conventionally prepared tea extract will become cloudy as the temperature of the extract decreases towards ambient temperatures or below. This clouding problem is more acute as the concentration of tea solids in the extract is increased. Single-strength or ready-to-drink tea beverages will typically contain a concentration of soluble tea solids of about 0.3% by weight. Aqueous tea concentrates which are designed to be diluted with water prior to consumption may have solid concentrations of up to 25% by weight or more. Clouding can also be a problem in aqueous tea extracts which are prepared by reconstituting powdered tea extracts, such as spray-dried tea.

The prior art is aware of precipitation techniques which overcome the clouding problem. U.S. Pat. No. 2,963,368 describes a process wherein a concentrated tea extract is cooled, thereby precipitating an insoluble tannin-caffeine complex and thereafter removing this precipitate from the extract by mechanical means such as centrifugation. A soluble and/or suspending agent (e.g. glycerol and/or gum) is then added to the clarified extract in order to maintain any remaining tannincaffeine complex in solution or suspension.

U.S. Pat. No. 4,315,036 discloses a tea decaffeination process wherein tea extract is cooled to produce an insoluble caffeine-tannin precipitate which is then separated from the extract, decaffeinated and added-back to the extract. The resulting extract would then be further decaffeinated by repeating the cycle in order to obtain a commercially-meaningful degree of decaffeination. This patent also states that tannins which are not derived from tea, such as tannic acid may be used in the process.

U.S. Pat. No. 2,978,328 discloses a process of a frozen tea concentrate which will maintain clarity following reconstitution in water. According to the process a freshly-prepared tea concentrate is combined with a calcium sequestering agent, such as a polyphosphate salt, before the concentrate is cooled and frozen.

U.S. Pat. No. 2,891,866 discloses a process for producing an improved tea product, such as a liquid tea concentrate or dried tea powder, which will not cloud when reconstituted in warm or hot water. The disclosed process adds a calcium salt to a tea extract or derivative thereof in an amount which is effective to produce a precipitate. The precipitate is then removed from the extract and the extract is thereafter concentrated or dried.

U.S. Pat. No. 3,163,539 to Bach discloses a process for an improved tea concentrate or tea powder which is soluble in cold water by subjecting cold-water, insoluble tea substances to treatment in an aqueous solution or slurry of sodium hydroxide. According to this process the pH of the solution or slurry is raised to at least 8.5, preferably at an elevated temperature, until the desired quantity of insoluble substances are solubilized. The resulting solution is then neutralized to a pH of 4.7 to 5.5, cooled and then clarified.

DESCRIPTION OF THE INVENTION

This invention is directed to a process for clarifying a concentrated tea extract such that the resulting liquid concentrate will remain clear for long periods of time at ambient temperature. The process of this invention is also advantageous since the concentrate will be adjusted in pH to a level which inhibits microbial growth. As a result of increased microbial stability, the tea concentrate of this invention does not need the high levels of preservatives, such as conventionally employed in the art, and will not have any undesirable flavor "burn" caused by the presence of high preservative levels.

According to the process of this invention an aqueous tea concentrate is prepared for treatment. This concentrate may either be a fresh brewed concentrate, such as obtained by infusing tea leaf material with hot water or a reconstituted concentrate, such as obtained by dissolving dried tea powder in water. The prepared aqueous concentrate will have a soluble solids content of about 8 to 24%, typically 12 to 18%, by weight and a pH of about 4.7 to 5.5. The pH of the aqueous concentrate is then reduced to a range of from about 2.9 to 3.5, preferably 3.1 to 3.3.

The lowered pH may be effected by addition of one or more food acceptable acids which will not impart any off-flavor to the tea beverages produced from the concentrated tea extract of this invention. Tannic acid, phosphoric acid, citric acid and hydrochloric acid are among the acids which may be used either alone or in combination. Typically, a mixture of acids will be employed so as to reduce the negative effects to an inconsequential level that might be produced with the use of a single acid. Tannic acid which is a natural component of tea is a preferred component of the acid ingredient added to the tea concentrate. Phosphoric acid is another preferred acid as it provides some sequestering functionality and is free adverse flavor effects.

The temperature of the pH lowered concentrate is maintained at a temperature of from 30° to 45° F. (−1.1° to 7.2° C.), preferably 32° to 38° F. (0° to 3.3° C.) for a period of at least one hour, preferably at least two hours. During this chill and hold step, agitation will be present but minimal in order to promote precipitation of acid and/or cold-water insoluble tea components. The precipitate has been found to be comprised of insoluble caffeine tannate and caffeine polyphenol complexes.

The resulting precipitate is separated from the liquid phase of the concentrate by any suitable means such as decanting, filtration or centrifugation alone or in combination. Centrifugation is a preferred step and equipment such as Westfalia TM clarifiers are suitable for use in this invention. Removal of the precipitate will typically result in a 5 to 20% reduction in level of the solids contained in the concentrate.

The clarified concentrate is thereafter elevated to a pH of about 3.9 to 4.3 preferably from about 4.0 to 4.2 such as through the addition of various food-approved alkaline materials. Stability of the tea concentrate appears to be optimum at a pH of about 4.1. An aqueous solution or slurry of sodium hydroxide, potassium hydroxide and/or ammonium hydroxide is useful for this purpose.

Various artificial and/or natural flavors may be added to the concentrate and this is preferably done after the pH is raised in order to avoid interactions which would affect the flavors. A low level of preservatives may be added to the concentrate to ensure the desired degree of stability is attained. Via the process of this invention, a high level of clarity is preserved for a minimum of six months at storage conditions for from 60° to 80° F. (15.6° to 26.7° C.). The concentrate also possesses excellent tea flavor as judged by experienced tasters.

It has also been found that improved results in terms of clarity are obtained if the water used to produce the aqueous tea concentrate is water that has been deionized. The use of ordinary tap water appears to result in the formation of fine insoluble material which is not readily removed during clarification. In the absence of metal ions such as calcium and magnesium, high molecular weight insolubles are formed which are easily removed via standard clarification techniques. The use of a regenerable mixed bed ion-exchange resin system in a conventional manner, such as any of the well-known column systems, is suitable for use in this invention. Preferably, the water will be at least 99% deionized. A suitable deionizer is Mixed Bed Deionizer (Model 2951) from Millipore TM (Richfield, N.J. 07657) which employs both anionic and cationic resins of the Rohm & Hass Company (IR-120 and IRA-410, respectively).

This invention is further described having reference at the following examples.

EXAMPLE 1

The efficiency of clarifying a tea concentrate at a reduced pH of about 3.3 was demonstrated in the following experiment. Two samples of aqueous tea concentrate were prepared as follows:

| Ingredient | Sample I | Sample II |
| --- | --- | --- |
| Spray Dried Tea Solids | 76.25 g | 76.25 g |
| Deionized Water | 421.00 g | 421.00 g |
| Tannic Acid | 2.75 g | 2.75 g |
| Phosphoric Acid (75% aqueous solution) | 4.3 g | 8.85 g |
| pH | 4.1 | 3.3 |

The concentrates of Samples I and II were held for 18 hours at 40° F. (4.4° C.) after which each Sample was centrifuged for 20 minutes in a centrifuge operating at 2100 rpm. Supernatants were collected and the Sample II effluent was adjusted to 4.1 pH by the addition of 0.16 g of NaOH pellets. The effluents were held at 70° F. (21.1° C.) for 60 hours at which time the level of insolubles contained in each of the concentrates was measured as 2% (by volume) for Sample I and only 0.8% (by volume) for Sample II thus establishing the benefit of the pH adjustment procedure of this invention.

EXAMPLE 2

The efficiency of using deionized water for preparing the tea concentrate which is to be clarified at a lowered pH is demonstrated in the following experiment. Two samples of aqueous tea concentrate were prepared using the following formulation with Sample I using deionized water (at least 99% deionized) and Sample II using tap water.

| Ingredient | Grams | Weight % |
| --- | --- | --- |
| Water | 421 | 84.2 |
| Spray Dried Tea Solids | 58 | 11.6 |
| Tannic Acid | 21 | 4.2 |

Both concentrates which had a pH of 4.5 were held at 40° F. (4.4° C.) for 18 hours and then centrifuged as in Example 1. The supernatants were collected, held at 70° F. (21.1° C.) for a day and analyzed for insolubles. Sample I was found to contain only 0.2% (by volume) of insolubles and appeared clearer than Sample II which contained 1.0% (by volume) of insolubles and appeared murky.

EXAMPLE 3

A high-quality, non-clouding tea concentrate was prepared in accordance with this invention and the following procedure. Into a batching tank which is equipped with agitating means, the following ingredients were added in sequence 25,808.5 pounds of deionized water (about 110° F. (43.3° C.), 118.3 pounds of tannic acid, 3,552.4 pounds of spray dried tea solids, and 520.9 pounds of phosphoric acid (75% solution) resulting in a solution which has a pH of 3.2 and a solid level of 15.6% by weight. Mixing is continued for about one hour to ensure complete dissolution of solids and then, under minimal agitation, the solution is chilled to about 35° F. and held for a minimum of two-hours. The resulting mixture is then decanted and centrifuged which yielded a solution having a solids concentration of 13.5% by weight.

The thus clarified solution was then adjusted to a pH of 3.9 with 173.4 pounds of a 50% solution of NaOH. Sodium benzoate and potassium sorbate were added as preservatives and natural and artificial flavors were also aded which resulted in a pH of 4.1, a solids level of 14% by weight and a preservative level of 0.29% by weight. The concentrate remains clear for a minimum of 6 months at a temperature of 60° F. (15.6° C.).

Having thus described the invention what is claimed is:

1. A method for producing a shelf-stable, non-clouding tea concentrate having a pH of from 3.9 to 4.3 consisting of the following steps:
   (a) producing a deionized, aqueous tea concentrate having a tea solids level of from 8 to 24% by weight and a pH of from about 4.7 to 5.5, said concentrate being either a fresh brewed concentrate which is obtained by infusing tea leaf material with hot, deionized water or a reconstituted concentrate which is obtained by dissolving spray-dried tea solids in deionized water;
   (b) adding food-acceptable acids to the aqueous tea concentrate of step (a) to reduce the pH to from 2.9 to 3.5;
   (c) reducing the temperature of the reduced - pH concentrate of step (b) from 30° to 45° F. and holding said concentrate at this reduced temperature for at least one hour in the presence of a minimal amount of agitation in order to produce a precipitate;
   (d) removing the precipitate from the concentrate of step (c) in order to clarify the concentrate, thereby resulting in a 5 to 20% reduction in the level of solids contained in the concentrate (e) raising the pH of the clarified concentrate to a level of from 3.9 to 4.3 by the addition of food-approved alkaline materials; and, thereafter, (f) storing the concentrate at ambient temperature.

2. The method of claim 1 wherein the concentrate of step (a) has a solids level of from 12 to 18%.

3. The method of claim 1 wherein the pH is reduced to from 3.1 to 3.3 in step (b).

4. The method of claim 1 wherein the added acid includes tannic acid.

5. The method of claim 1 wherein the added acid is a combination of tannic acid and phosphoric acid.

6. The method of claim 1 wherein the temperature of the concentrate is reduced to from 32° to 38° F. in step (c).

7. The method of claim 1 wherein precipitate is removed by means of a centrifuge.

8. The method of claim 1 wherein the pH is raised in step (e) to from about 4.0 to 4.2.

9. The method of claim 1 wherein preservative and flavor is added to the clarified concentrate along with the alkaline material.

* * * * *